(12) United States Patent
Ishiwata et al.

(10) Patent No.: US 8,223,144 B2
(45) Date of Patent: Jul. 17, 2012

(54) METHOD AND APPARATUS FOR PROCESSING OBJECT COLLISION

(75) Inventors: Tatsuya Ishiwata, Tokyo (JP); Masahiro Yasue, Kanagawa (JP)

(73) Assignee: Sony Corporation Entertainment Inc., Tokyo (JP)

( * ) Notice: Subject to any disclaimer, the term of this patent is extended or adjusted under 35 U.S.C. 154(b) by 1008 days.

(21) Appl. No.: 11/950,864

(22) Filed: Dec. 5, 2007

(65) Prior Publication Data

US 2008/0170080 A1    Jul. 17, 2008

(30) Foreign Application Priority Data

Jan. 11, 2007 (JP) ................... 2007-003359

(51) Int. Cl.
*G06T 15/00* (2011.01)
(52) U.S. Cl. ........ 345/419; 345/473; 345/474; 345/475; 345/958; 345/427; 345/581; 345/629; 463/322; 700/255; 701/301
(58) Field of Classification Search .................. 345/419, 345/473, 474, 427, 581, 629, 502, 420, 958; 463/322; 700/255; 701/301
See application file for complete search history.

(56) References Cited

U.S. PATENT DOCUMENTS

| | | | |
|---|---|---|---|
| 6,791,549 B2* | 9/2004 | Hubrecht et al. | ............. 345/473 |
| 6,912,565 B1 | 6/2005 | Powers et al. | |
| 7,127,381 B2* | 10/2006 | Forest et al. | ...................... 703/2 |
| 7,146,297 B2* | 12/2006 | Marshall et al. | ................... 703/6 |
| 7,191,104 B2* | 3/2007 | Stewart et al. | ..................... 703/2 |
| 7,471,297 B2* | 12/2008 | Yamamoto et al. | ........... 345/473 |
| 7,557,808 B2* | 7/2009 | Yamamoto et al. | ........... 345/474 |
| 7,653,262 B2* | 1/2010 | Aonuma et al. | ............... 382/291 |
| 7,663,629 B2* | 2/2010 | Ajioka et al. | ................. 345/473 |
| 7,663,630 B2* | 2/2010 | Kim et al. | ..................... 345/473 |
| 7,679,623 B2* | 3/2010 | Miyamoto et al. | ............ 345/619 |
| 7,689,683 B2* | 3/2010 | Kato et al. | .................... 709/223 |
| 7,737,978 B2* | 6/2010 | Nakamura et al. | ............ 345/473 |
| 7,788,071 B2* | 8/2010 | Bond et al. | ......................... 703/6 |
| 7,967,680 B2* | 6/2011 | Yamada et al. | ................. 463/31 |

FOREIGN PATENT DOCUMENTS

| | | |
|---|---|---|
| JP | 06314323 A | 11/1994 |
| JP | 2001521227 B1 | 11/2001 |
| JP | 20045572 A | 1/2004 |
| JP | 2006221639 A | 8/2006 |

OTHER PUBLICATIONS

Office Action for Japanese Patent Application No. 2007-003359, Jan. 27, 2009.
Office Action for Japanese Patent Application No. 2007-003359, Oct. 28, 2008.

* cited by examiner

*Primary Examiner* — Kimbinh T Nguyen
(74) *Attorney, Agent, or Firm* — Matthew B. Dernier, Esq.; Gibson & Dernier LLP

(57) ABSTRACT

A parallelization permission and prohibition management unit of a processor manages the permission or prohibition of the parallelization for each combination of partial spaces in cooperation with another parallelization permission and prohibition management unit of a different processor. Specifically, when any given object is present across the boundary between a first partial space and a second partial space, the parallelization is prohibited between the collision process to be performed by any given processor on the virtual objects in the first partial space and the collision process to be performed by another processor on the virtual object in the second partial space.

19 Claims, 8 Drawing Sheets

FIG.5

|  | CELL 0 | CELL 1 | CELL 2 | CELL 3 | CELL 4 | CELL 5 |
|---|---|---|---|---|---|---|
| CELL 0 | 0 | 1 | 0 | 0 | 0 | 0 |
| CELL 1 | 1 | 0 | 0 | 0 | 1 | 0 |
| CELL 2 | 0 | 0 | 0 | 0 | 0 | 0 |
| CELL 3 | 0 | 0 | 0 | 0 | 1 | 0 |
| CELL 4 | 0 | 1 | 0 | 1 | 0 | 1 |
| CELL 5 | 0 | 0 | 0 | 0 | 1 | 0 |

FIG.6

| PROCESSOR | CELL BEING PROCESSED | CELL 0 | CELL 1 | CELL 2 | CELL 3 | CELL 4 | CELL 5 |
|---|---|---|---|---|---|---|---|
| FIRST PROCESSOR 111 | NONE | 0 | 0 | 0 | 0 | 0 | 0 |
| SECOND PROCESSOR 122 | CELL 2 | 0 | 0 | 0 | 0 | 0 | 0 |
| THIRD PROCESSOR 133 | CELL 1 | 1 | 0 | 0 | 0 | 1 | 0 |
| PROCESS IS BEING PERFORMED OR PROCESS HAS BEEN COMPLETED | | 0 | 1 | 1 | 0 | 0 | 0 |
| OR | | 1 | 1 | 1 | 0 | 1 | 0 |

|  | G 0 (0~99) | G 1 (100~199) | G 2 (200~299) | G 3 (300~399) | G 4 (400~499) | G 5 (500~599) |
|---|---|---|---|---|---|---|
| G 0 (0~99) | CELL 0<br>1-46<br>46-58 |  | CELL 1<br>58-258 |  |  |  |
| G 1 (100~199) |  |  |  |  |  |  |
| G 2 (200~299) |  |  |  | CELL 2<br>258-325 |  | CELL 3<br>258-567 |
| G 3 (300~399) |  |  |  |  | CELL 4<br>325-452 |  |
| G 4 (400~499) |  |  |  |  |  | CELL 5<br>452-593 |
| G 5 (500~599) |  |  |  |  |  |  |

FIG.12

|  | CELL 0 (G0:G0) | CELL 1 (G0:G2) | CELL 2 (G2:G3) | CELL 3 (G2:G5) | CELL 4 (G3:G4) | CELL 5 (G4:G5) |
|---|---|---|---|---|---|---|
| CELL 0 (G0:G0) | 0 | 1 | 0 | 0 | 0 | 0 |
| CELL 1 (G0:G2) | 1 | 0 | 1 | 1 | 0 | 0 |
| CELL 2 (G2:G3) | 0 | 1 | 0 | 1 | 1 | 0 |
| CELL 3 (G2:G5) | 0 | 1 | 1 | 0 | 0 | 1 |
| CELL 4 (G3:G4) | 0 | 0 | 1 | 0 | 0 | 1 |
| CELL 5 (G4:G5) | 0 | 0 | 0 | 1 | 1 | 0 |

METHOD AND APPARATUS FOR PROCESSING OBJECT COLLISION

BACKGROUND OF THE INVENTION

1. Field of the Invention

The present invention relates to a technique for handling a collision between virtual objects.

2. Description of the Related Art

The movement or behavior of a three-dimensional (3D) virtual object is managed by a physical engine in, for example, a game console. When there is a collision between the virtual objects, the process of applying repulsive force is essential in the physical engine. The process of applying the repulsive force demands that the velocity of the virtual object needs to be updated. Meanwhile, the processes to be handled by the physical engine are, in some cases, performed by plural processors in parallel, in order to increase the processing speed. It is now assumed that a virtual object A and a virtual object B are colliding with each other, and the virtual object B and a virtual object C are colliding with each other. In this situation, it is also assumed that any given processor updates the velocity of the object B in accordance with the collision process between the objects A and B, and at the same time, a different processor updates the velocity of the object B in accordance with the collision process between the objects B and C. If this happens, the process of updating the velocity of the object B by any given processor conflicts with the process of updating the same by a different processor, thereby leading to the possibility that inconsistent data is written into the velocity of the object B. In general, an exclusive control using semaphore or the like is performed to avoid the above-mentioned conflict.

It should be apparent that the exclusive control achieves some satisfactory results from the perspective of avoiding the conflict. However, when there are a number of virtual objects to be managed by the physical engine, a considerable amount of calculation is required for each of the virtual objects in order to perform the process of exclusive control. This might cause a situation in which the effect produced by parallel processing is not applicable in an efficient manner. Such a situation will be a big problem in real-time processing, in particular, such as a collision process performed by the physical engine.

SUMMARY OF THE INVENTION

The present invention has been made in view of the above circumstances and has a general purpose of increasing the efficiency of parallelization of collision processes between virtual objects to be performed by plural processors.

An object collision processing method according to an embodiment of the present invention, comprises: dividing a virtual space where a plurality of virtual objects are present, into a plurality of partial spaces; prohibiting parallelization of a collision process to be performed by a processor on at least one virtual object in a first partial space and another collision process to be performed by another processor on at least one virtual object in a second partial space, if any one of the virtual objects is present across a boundary between the first partial space and the second partial space; performing the parallelization of the collision processes on the virtual objects in a unit of partial space, by allowing each of a plurality of processors to perform the collision process on at least one virtual object in any one of the partial spaces.

According to the above embodiment, the parallelization is prohibited in a unit of partial space and therefore an exclusive control to be performed on each virtual object can be eliminated. This reduces the amount of calculation in the process for the exclusive control.

An object collision processing method according to another embodiment of the present invention, comprises: dividing a plurality of virtual objects into a plurality of groups according to a predetermined rule; prohibiting parallelization of a collision process to be performed by a processor on a first pair of the colliding virtual objects and another collision process to be performed by another processor on a second pair of the colliding virtual objects, one of the first paired objects belonging to a first group and the other of the first paired objects belonging to a second group, if any one of the second paired objects belongs to the first group or the second group; and performing the parallelization of the collision processes on the virtual objects, by allowing each of a plurality of processors to perform the collision process on any one of the pairs of the virtual objects.

According to the above embodiment, the prohibition of the parallelization is defined based on a group to which any one of the paired colliding virtual objects belongs and therefore an exclusive control to be performed on each virtual object can be eliminated. This reduces the amount of calculation in the process for the exclusive control.

Optional combinations of the aforementioned constituting elements, and implementations of the invention in the form of methods, processors, apparatuses, systems, recording media, computer programs, data structures, etc. may also be practiced as additional may also be implemented as additional modes of the present invention.

BRIEF DESCRIPTION OF THE DRAWINGS

FIG. 5 illustrates contents recorded in the parallelization permission/prohibition management table of FIG. 2;

FIG. 6 illustrates the contents recorded in the dynamic management table of FIG. 2 at a given point of time;

FIG. 12 illustrates the contents recorded in the parallelization permission/prohibition management table of FIG. 8.

DETAILED DESCRIPTION OF THE INVENTION

Figure 1:
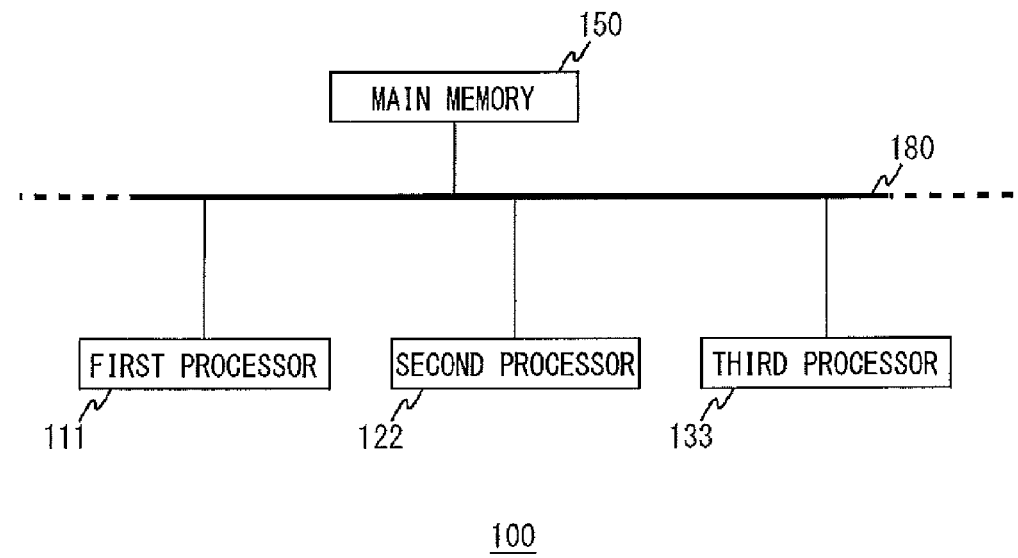
FIG. 1 illustrates a hardware configuration of an object collision processing apparatus according to a first embodiment of the present invention.

The invention will now be described by reference to the preferred embodiments. This does not intend to limit the scope of the present invention, but to exemplify the invention.

Hereinafter, preferred embodiments of the present invention will be described in detail, with referent to the drawings. Like reference characters designate like or corresponding elements, members and processes throughout the views. The description of them will not be repeated for brevity. Reference herein to details of the illustrated embodiments is not intended to limit the scope of the claims. It should be understood that not all of the features and the combination thereof discussed are essential to the invention.

[First Embodiment]

In the present embodiment, collision processes between virtual objects are parallelized and then performed by plural processors. One of the features thereof is to eliminate the process for the exclusive control over each of the virtual objects.

FIG. 1 illustrates a hardware configuration of an object collision processing apparatus 100 according to a first embodiment of the present invention. The configuration shown in the figure plays a role as a physical engine of a computer such as, for example, a game console.

The object collision processing apparatus 100 is provided with: a first processor 111; a second processor 122; a third processor 133; a main memory 150; and a bus 180 connecting the above components with each other. The main memory 150 is illustrative of the "memory area" in the present invention, and is shared by the first processor 111 through the third processor 133. The first processor 111 through the third processor 133 are illustrative of "a plurality of processors" in the present invention, each having the functions of a general-purpose processor such as fetching, decoding, and executing an instruction, etc.

Figure 2:
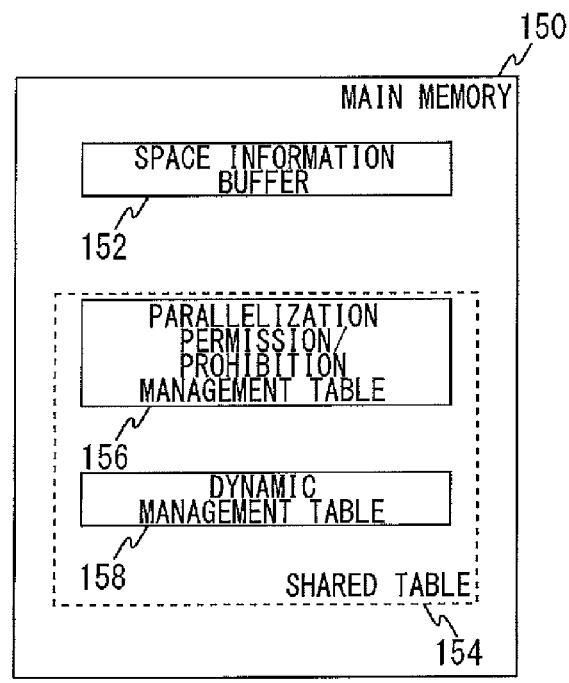
FIG. 2 illustrates a block diagram of a memory area of the main memory of FIG. 1.

FIG. 2 illustrates a block diagram of a memory area of the main memory 150 of FIG. 1. The main memory 150 includes: a space information buffer 152; and a shared table 154. The shared table 154 includes: a parallelization permission/prohibition management table 156; and a dynamic management table 158. The space information buffer 152 stores information on a virtual space at a given point of time. The above information includes the location of a virtual object and the velocity thereof. The shared table 154 is illustrative of "table" in the present invention, and is provided to manage the parallelization of the collision processes. The parallelization permission/prohibition management table 156 is provided to store the permission or prohibition of the parallelization for each combination of partial spaces, whereas the dynamic management table 158 is provided to specify the collision process which is permitted to perform the parallelization with the collision process that is currently being performed. The specific contents stored in the tables previously mentioned will be described later in detail.

Figure 3:
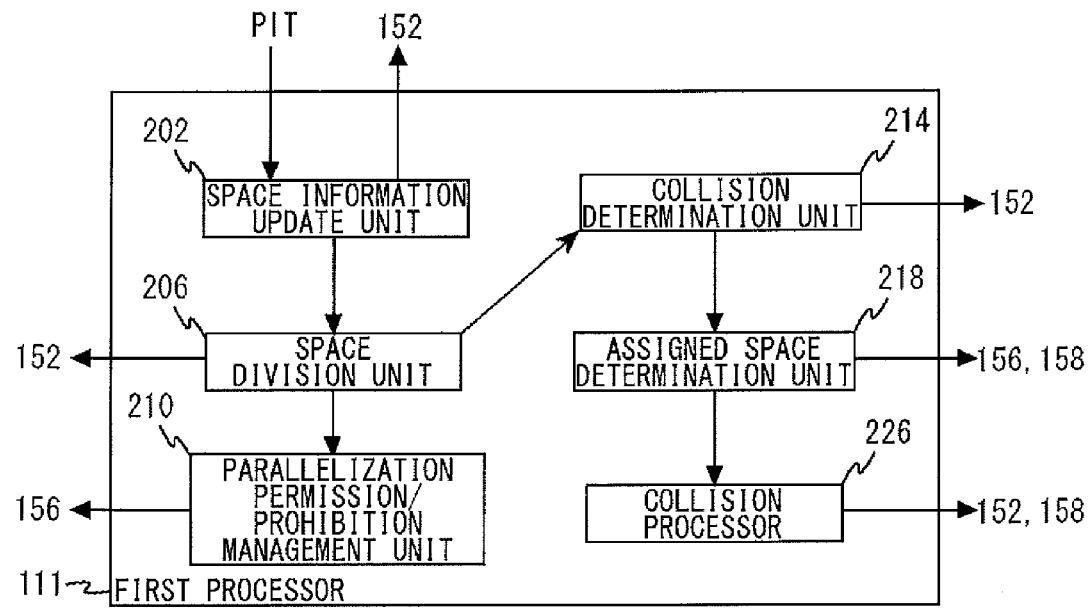
FIG. 3 illustrates a functional block diagram of the first processor of FIG. 1.

FIG. 3 illustrates a functional block diagram of the first processor 111 of FIG. 1. Each of the blocks in the figure is implemented when the first processor 111 loads an object collision processing program into the main memory 150 and then executes the program. Alternatively, in the case where the first processor 111 has a local memory therein, each of the blocks shown in FIG. 3 may be implemented when the first processor 111 loads the object collision processing program into the local memory and then executes the program. In addition, the second processor 122 and the third processor 133 (hereinafter, also referred to as "the other processors") respectively fulfill similar functions as the first processor 111.

The first processor 111 is provided with: a space information update unit 202; a space division unit 206; a parallelization permission/prohibition management unit 210; a collision determination unit 214; an assigned space determination unit 218; and a collision processor 226. The space information update unit 202 updates the contents recorded in the space information buffer 152 in cooperation with the space information update units (not shown) of the other processors. That is to say, the location and the velocity of the virtual object in a virtual space are processed for each unit of time. This process is triggered by a signal fed from, for example, an external Programmable Interrupt Timer (PIT). The length of time step is not limited especially, but may be determined according to the maximum value of the velocity of the virtual object to be anticipated. The PIT could be built inside the first processor 111.

Figure 4:
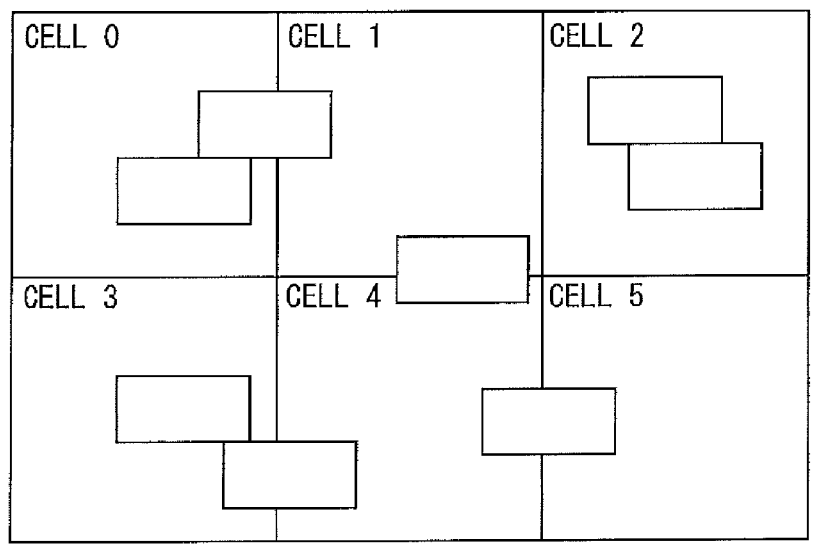
FIG. 4 illustrates the division of a space according to the first embodiment of the present invention.

The space division unit 206 divides a virtual space where plural virtual objects are present into plural partial spaces, in cooperation with the space division units (not shown) of the other processors. FIG. 4 illustrates the dividing of the space according to the first embodiment of the present invention. In this example, the virtual space where eight virtual objects are present is divided into six partial spaces. Hereinafter, the partial space will be referred to as "cell" as necessary, and six partial spaces will be distinguished from one another by expressing them as "cell 0" through "cell 5", respectively. The number and the shape of the partial spaces are not limited to those of FIG. 4, and variations thereof are applicable in various manners. Referring back to FIG. 3, the parallelization permission/prohibition management unit 210 manages the permission or prohibition of the parallelization for each combination of partial spaces, in cooperation with the parallelization permission/prohibition management units (not shown here) of the other processors. This is performed by updating the parallelization permission/prohibition management table 156 of FIG. 2. Hereinafter, a specific example will be given.

FIG. 5 illustrates contents recorded in the parallelization permission/prohibition management table 156 of FIG. 2. This example is based upon the case where the positional relationships between plural partial spaces and plural virtual objects are shown in FIG. 4. In this case, one virtual object is present across the boundary between the cell 0 and the cell 1, so "1" is written in the addresses respectively corresponding to the combination of the cell 0 and the cell 1. The parallelization permission/prohibition management unit of one of the processors performs the writing. The writing of "1" corresponds to setting a prohibition flag, thereby prohibiting the parallelization of the collision process to be performed on the virtual object in the cell 0 by any one of the processors and the collision process to be performed on the virtual object in the cell 1 by another processor. In the same manner as described above, "1" is also written in the addresses respectively corresponding to the combination of the cell 1 and the cell 4, the combination of the cell 3 and the cell 4, and the combination of the cell 4 and the cell 5, whereby the parallelization is prohibited. The prohibition as described above prevents the inconsistency of data produced when the velocity of the virtual object present across the boundary is updated by plural processors at the same time.

Meanwhile, there is no virtual object present across the boundary between the cell 0 and the cell 3 in FIG. 4, so "0" is written in the addresses corresponding to the combination of the cell 0 and the cell 3. The parallelization permission/prohibition management unit of one of the processors performs the writing. The writing of "0" corresponds to setting a permission flag, thereby permitting the parallelization of the collision process to be performed on the virtual object in the cell 0 by an arbitrary processor and the collision process to be performed on the virtual object in the cell 3 by another processor. In the same manner as described above, "0" is written in the addresses corresponding to the combination of cells where there is no virtual object present across the boundary. Such permission contributes to the efficiency of the parallel processing.

If there are a number of virtual objects and the process for the exclusive control is performed on each of the virtual objects, the amount of calculation will be a considerable one. This tends to result in the inefficient parallel processing and the increased cost. However, if the permission or prohibition of the parallelization can be determined in a unit of partial space, the problem will be alleviated. This knowledge of the inventors of the present invention serves as a basis for embodiments of the present invention.

Referring back to FIG. 3, the collision determination unit 214 determines whether or not there is a collision between the virtual objects in any one of the cells. The collision determination units (not shown) respectively implemented by the second processor 122 and the third processor 133 also determine whether or not there is a collision between the virtual objects in any one of the cells in the same manner. By thus employing parallelization by a unit of partial space, the possibility of a collision between the virtual objects is determined. After the collision determination is completed in all cells, if the determination is made that there is a collision in any one of the cells, the collision process is performed subsequently. The collision process includes a process of updating parameters representing attributes of the virtual object in response to the collision. The attribute denotes the physical state or property such as a velocity, shape, color, sound, weight, viscosity or the like, but does not necessarily have to follow a physical law. The collision process includes a process of applying to a colliding virtual object, for example, a repulsive force caused by a collision. The collision process also includes merging, disappearing, or changing of the shape resulting from a collision. The collision process may comply with a physical law, or may comply with a predetermined definition such as a rule of a game.

The assigned space determination unit 218 determines in which one of plural partial spaces the collision processor 226 performs the collision process on the virtual object, by referring to the dynamic management table 158 of FIG. 2. Likewise, the assigned space determination units (not shown) respectively implemented by the second processor 122 and the third processor 133 also determine in which one of plural partial spaces the collision processor of the respective processor performs the collision process on the virtual object. The recorded contents of the dynamic management table 158 are determined, according to information in the parallelization permission/prohibition management unit 210, namely, the contents recorded in the parallelization permission/prohibition management table 156 and the current state of the collision process. Hereinafter, a specific example will be given.

FIG. 6 illustrates the contents recorded in the dynamic management table 158 of FIG. 2 at a given point of time. In a similar manner to FIG. 5, this example is based upon the case where the positional relationships between plural partial spaces and plural virtual objects are shown in FIG. 4. The dynamic management table 158 stores, broadly speaking, the following types of information, which are updated by the assigned space determination unit of each processor so as to reflect the current state of the collision process.

Permission or prohibition of the parallelization of the cell where the collision process is currently being performed by any one of the first processor 111 through the third processor 133, and any one of the other cells ("0": permission, "1": prohibition);

The distinction between the cell where the collision process is currently being performed or the collision process has already been completed, and the cell where the collision process has not yet been initiated ("0": the process has not been initiated yet, "1": the process is being performed or the process has been completed); and Results of the logical OR operation of the above two types of values for the respective cells ("0": the process is enabled, "1": the process is disabled).

Regarding the cell having the result of the logical OR operation "0", the parallelization with the cell where the collision process is currently being performed is not prohibited, and the process has not been initiated yet. Conversely, regarding the cell having the result of the logical OR operation "1", the parallelization with the cell where the collision process is currently being performed is prohibited, or the process is currently being performed or has already been completed.

The contents recorded in FIG. 6 reflect the following circumstances.

The first processor 111 is not performing a collision process on a virtual object.

The second processor 122 is performing the collision process on the virtual object(s) in the cell 2.

The third processor 133 is performing the collision process on the virtual object(s) in the cell 1.

No collision process has been completed in any of the cell 0 through the cell 5.

According to data in the third row of FIG. 6, the third processor 133 is currently performing the collision process on the virtual object(s) in the cell 1, and the parallelization with the above collision process is enabled in the cell 1 through the cell 3 and the cell 5, respectively. The above data is obtainable by copying the data in the second row of FIG. 5. The parallelization of the cell 1 is not prohibited according to the third row of FIG. 6, although the collision process is currently being performed on the virtual object(s) in the cell 1. However, the parallelization of the cell 1 is prohibited by the data in the fourth row. According to the fourth row of FIG. 6, the collision process is currently being performed or has already been completed, in the cell 1 and the cell 2. According to the fifth row of FIG. 6, the collision process is enabled in the cell 3 or the cell 5, in the above situation. Therefore, the collision process to be performed on the virtual object(s) in the cell 3 or the cell 5 can be assigned to the first processor 111 that is not currently performing any collision process.

Referring back to FIG. 3, the assigned space determination unit 218 assigns the collision process to be performed on the virtual object(s) in the cell 3 or the cell 5 to the collision processor 226 of the first processor 111, based upon the contents recorded in the dynamic management table 158, according to the recorded contents depicted in, for example, FIG. 6. For instance, in a case where the collision process to be performed on the virtual object(s) in the cell 3 is assigned to the first processor 111, the assigned space determination unit 218 copies the data in the fourth row of FIG. 5 to the first row of FIG. 6, and in addition, writes "1" in the cell 3 in the fourth row of FIG. 6 as a flag representing "being processed".

The collision processor 226 performs the collision process in the cell that has been assigned by the assigned space determination unit 218. In the present embodiment, a distributed memory architecture is employed in which each of the processors has a local memory (not shown) therein. For this reason, the collision processor 226 reads, for example, the velocity data of the virtual object present in the assigned cell, from the space information buffer 152 into the memory in the first processor 111, and calculates the repulsive force to be applied by the collision, and then writes the result back in the space information buffer 152. The collision processors (not shown) respectively implemented by the second processor 122 and the third processor 133 also perform the collision processes on the virtual objects in the cells that have been assigned by the assigned space determination units of the corresponding processors. In this manner, the collision processes to be performed on the virtual objects are parallelized in a unit of partial space and then executed. When the collision process for the virtual object(s) is completed in the assigned cell, the collision processor 226 clears the data in the first row of FIG. 6 to set "0" therein, and then awaits the next assignment.

Figure 7:
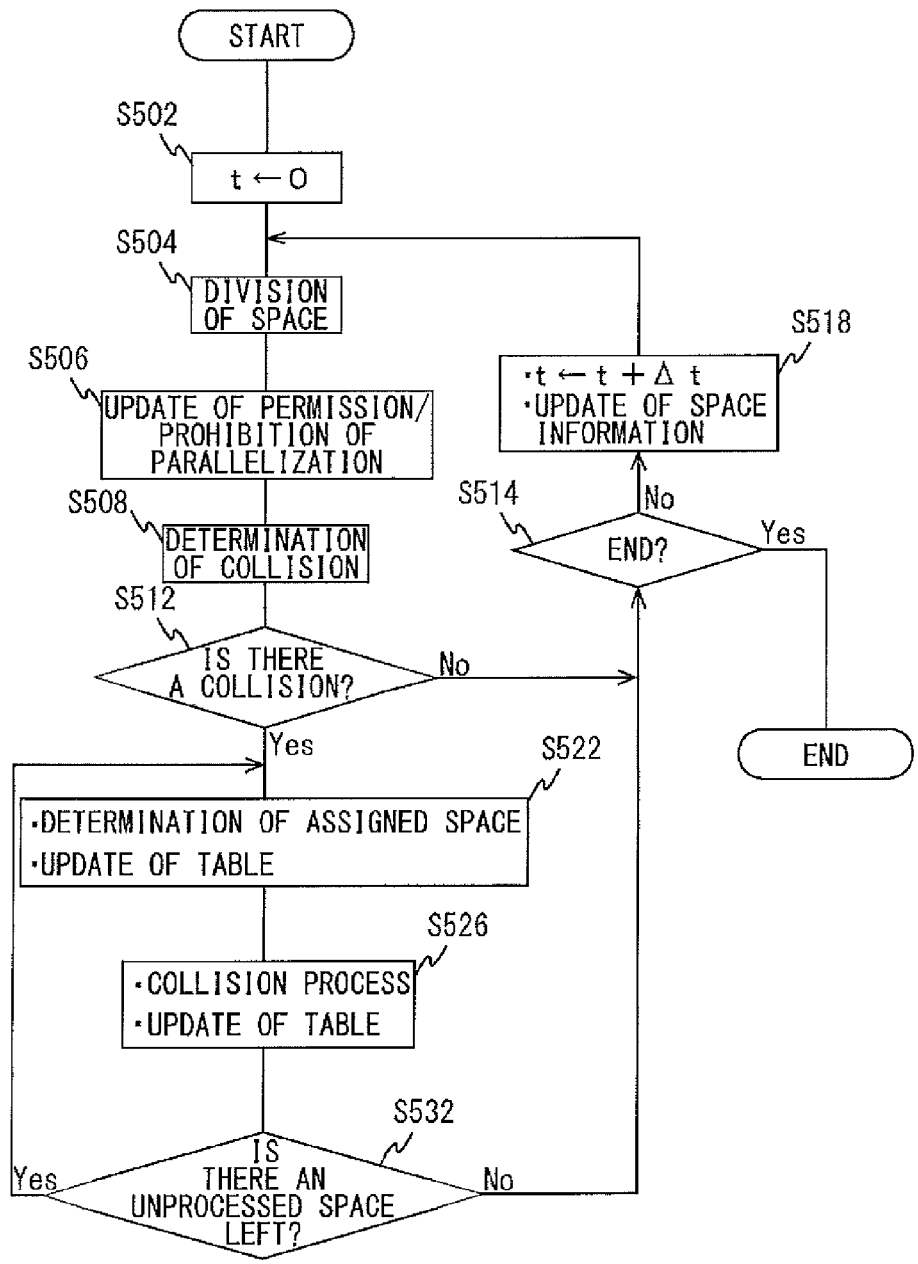
FIG. 7 is a flowchart of the operation of the first processor of FIG. 3.

FIG. 7 is a flowchart of the operation of the first processor 111 of FIG. 3. Hereinafter, a description will be given with reference to FIG. 3. First, a parameter "t" representing the time is initialized to be zero (S502). The space division unit 206 divides the virtual space where plural virtual objects are present into plural partial spaces, in cooperation with the other space division units of the other processors (S504). The parallelization permission/prohibition management unit 210 updates the parallelization permission/prohibition management table 156 of FIG. 2, in cooperation with the parallelization permission/prohibition management units of the other processors (S506). The collision determination unit 214 determines whether or not there is a collision in any one of the partial spaces (S508). When there is no collision (No of S512), the space information update unit 202 updates the location and the velocity of the virtual object by "Δt" (S518) subsequent to the end determination (No of S514). After that, a series of processes from the step of dividing the space (S504) to the step of determining the collision (S508) are performed again. In this process, if, for example, a user gives an instruction of interrupt, the collision process is terminated after the end determination is performed (Yes of S514).

When there is a collision (Yes of S512), the assigned space determination unit 218 determines in which one of the partial spaces the collision processor 226 should perform the collision process, by referring to the dynamic management table 158 depicted in FIG. 2, and updates the dynamic management table 158 based upon the above determination (S522). The collision processor 226 performs the collision process on the virtual object(s) in the partial space that has been determined by the assigned space determination unit 218. When finishing the processing, the collision processor 226 updates the dynamic management table 158 (S526). Then, when there is a partial space where the collision process has not been initiated yet (hereinafter, referred to as "unprocessed space") (Yes of S532), the determination of the space to be assigned (S522) and the collision process (S526) are performed again. When there is no unprocessed space left (No of S532), the space information update unit 202 updates the location and the velocity of the virtual object by Δt (S518) after the end determination is performed (No of S514). After that, a series of processes from the step of dividing the space (S504) to the step of the collision process (S526) are performed again.

According to the present embodiment, the parallelization permission/prohibition management unit 210 stores in the parallelization permission/prohibition management table 156 the permission or prohibition of the parallelization in a unit of partial space so that the assigned space determination unit 218 can determine a partial space to be assigned to the collision processor 226 accordingly. This releases the collision processor 226 from performing the process for the exclusive control over each of the virtual objects, therefore resulting in the contribution to the improved efficiency and reduced cost.

Also, the dynamic management table 158 is updated by the assigned space determination unit and the collision processor of each processor, and the assigned space determination unit of each processor refers to the dynamic management table 158 to assign the partial space where the collision process can be performed at present by the collision processor thereof. Thus, this eliminates the necessity of a separate processor for the central control over the parallel processing. This is advantageous for simplifying the hardware configuration of the object collision processing apparatus 100.

In addition, the assigned space determination unit and the collision processor of each processor update the dynamic management table 158 so as to reflect the current state of the collision process, and the assigned space determination unit of each processor assigns the collision process in any one of the partial spaces to the collision processor thereof based upon the latest state. Such a dynamic management minimizes the complexity associated with the parallelization, resulting in an excellent efficiency of the parallel processing.

Furthermore, plural partial spaces, which are acquired by the division of the space performed by the space division unit 206, are utilized for the determination of the collision, and each of which is also utilized as a unit for the parallelization of the collision processes. This does not increase the amount of calculation in particular, when determining whether or not the parallelization is permitted.

[Second Embodiment]

In this embodiment, a mechanism, which is different from the first embodiment, eliminates the necessity of the process for the exclusive control over each of the virtual objects. The hardware configuration of an object collision processing apparatus according to the second embodiment is the same as FIG. 1.

Figure 8:
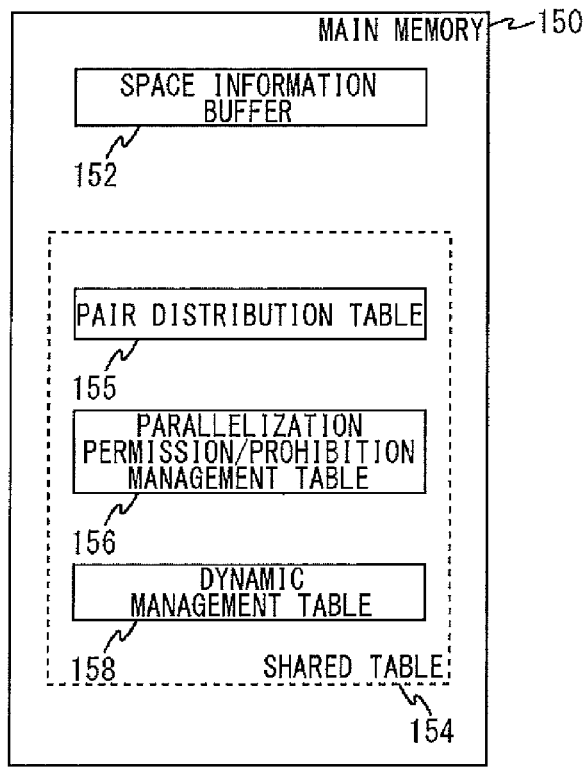
FIG. 8 illustrates a block diagram of a memory area of a main memory according to a second embodiment of the present invention.

Hereinafter, a description will be given of the present embodiment, focusing on its differences from the first embodiment. FIG. 8 illustrates a block diagram of the memory area in the main memory 150 according to the second embodiment of the present invention. In this figure, the difference with FIG. 2 is that a pair distribution table 155 is provided in the shared table 154. The contents recorded in the pair distribution table 155 will be described later.

Figure 9:
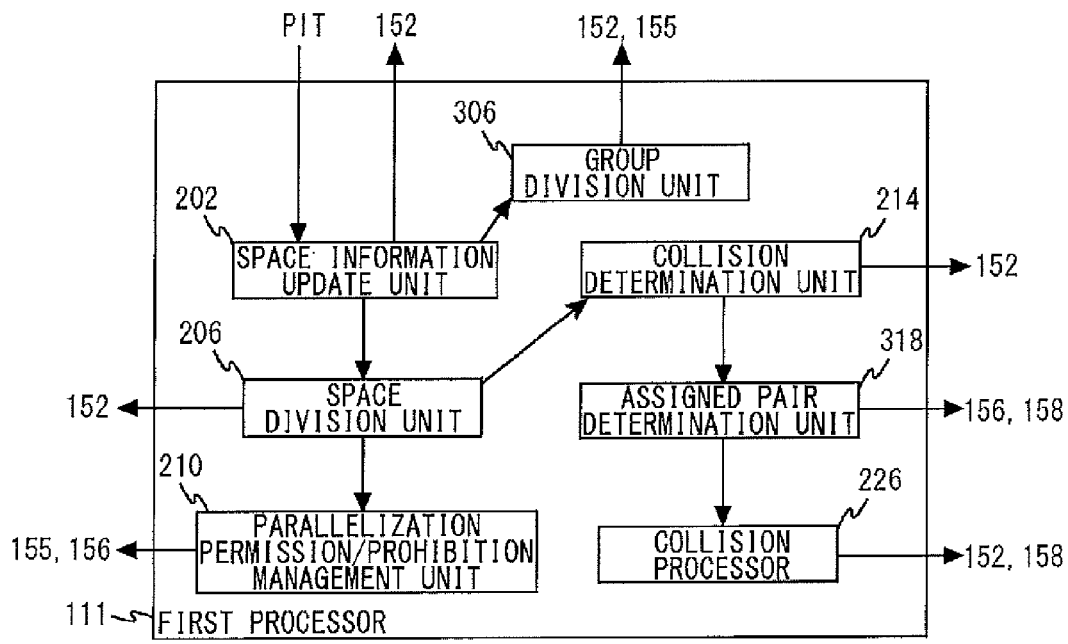
FIG. 9 illustrates a functional block diagram of the first processor according to the second embodiment of the present invention.

FIG. 9 illustrates a functional block diagram of the first processor 111 according to the second embodiment of the present invention. In this figure, the differences with FIG. 3 are that a group division unit 306 is additionally provided and the assigned space determination unit 218 is replaced with an assigned pair determination unit 318. The second processor 122 and the third processor 133 respectively fulfill similar functions as the first processor 111.

In the present embodiment, numerals are respectively given to plural virtual objects in advance. The group division unit 306 divides plural virtual objects into plural groups based upon the numerals thereof. As an example of the division, the group division unit 306 causes the virtual objects, having the numerals "0" through "99", to belong to a group G0, and causes the virtual objects, having the numerals "100" through "199", to belong to a group G1, . . . , and also causes the virtual objects, having the numerals "500" through "599", to belong to a group G5. The numerals respectively applied to the virtual objects are illustrative of "identification information" in the present invention. The identification information may be any type of information by which each of the plural virtual objects can be identified.

The collision determination unit 214 performs the collision determination in a similar manner to the first embodiment, and in addition, distributes a pair of virtual objects based upon the groups to which the paired virtual objects belong, every time a pair of virtual objects that are colliding with each other is found. This is achieved by updating the pair distribution table 155 of FIG. 8. Hereinafter, a specific example will be given.

Figures 10, 11:
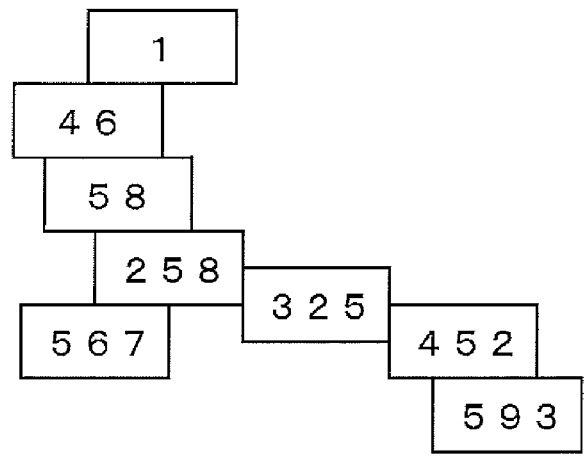
FIG. 10 illustrates a collision state of virtual objects at a given point of time.
FIG. 11 illustrates the contents recorded in the pair distribution table of FIG. 8 in the state as shown in FIG. 10.

FIG. 10 illustrates the collision state of the virtual objects at a given point of time. Hereinafter, "virtual object n" represents a virtual object having a numeral "n". FIG. 11 illustrates the contents recorded in a pair distribution table 155 in the state of FIG. 10. The recorded contents include pairs of the virtual objects, which are determined by the collision determination unit 214 of FIG. 9 that the paired virtual objects are respectively colliding with each other in the state of FIG. 10 and are then distributed.

Hereinafter, when a virtual object m and a virtual object n are colliding with each other, the pair of these objects will be referred to as "virtual object pair m-n". A virtual object pair 1-46 is classified into the combination of the group G0 and the group G0, because one and the other belong to the group G0. Likewise, a virtual object pair 46-58 is also classified into the combination of the group G0 and the group G0. A virtual object pair 58-258 is classified into the combination of the group G0 and the group G2, because one of them belongs to the group G0 and the other belongs to the group G2. The other pairs of the virtual objects are classified into an appropriate combination of the groups, respectively, in similar manners. Hereinafter, each of the combinations of the groups into which the pairs of the virtual objects are classified will be referred to as "cell", as necessary. Six groups, into which the pairs of the virtual objects are respectively classified in FIG. 11, will be referred to as "cell 0" through "cell 5" in order to distinguish one from another. Referring back to FIG. 9, the parallelization permission/prohibition management unit 210 manages the permission or prohibition of the parallelization for each combination of the cells, in cooperation with the parallelization permission/prohibition management units (not shown) of the other processors. This is accomplished by updating the parallelization permission/prohibition management table 156 of FIG. 8. Hereinafter, a specific example will be given.

FIG. 12 illustrates the contents recorded in the parallelization permission/prohibition management table 156 of FIG. 8. This example is based upon the case where pairs of the virtual objects colliding with each other are classified into the respective cells, as shown in FIG. 11. In this case, since both of the cell 0 and the cell 1 include the group G0, that is, a common group, "1" is written in the addresses corresponding to the combination of the cell 0 and the cell 1. The parallelization permission/prohibition management unit of one of the processors performs the writing. The writing of "1" corresponds to setting a prohibition flag. This prohibits the parallelization of the collision process to be performed by an arbitrary processor on the pair of the virtual objects that have been classified into the cell 0, and the collision process to be performed by another processor on the pair of the virtual objects that have been classified into the cell 1. Likewise, "1" is also written in the addresses corresponding to the combinations of the cells 1 and 2, the cells 1 and 3, the cells 2 and 3, the cells 2 and 4, the cells 3 and 5, and the cells 4 and 5, respectively, whereby the parallelization is prohibited for these combinations. The above prohibition prevents the inconsistency of data that could occur if plural processors simultaneously update the velocity of a single virtual object that belongs to the group common to two cells.

Meanwhile, since the cell 0 and the cell 2 do not include the common group, "0" is written in the addresses corresponding to the combination of the cell 0 and the cell 2. The parallelization permission/prohibition management unit of one of the processors performs the writing. The writing of "0" corresponds to setting a permission flag. This permits the parallelization of the collision process to be performed by an arbitrary processor on the pair of the virtual objects that have been classified into the cell 0, and the collision process to be performed by another processor on the pair of the virtual objects that have been classified into the cell 2. Likewise, "0" is written in the addresses corresponding to the combination of the cells that do not include the common group, whereby the parallelization is permitted. The above permission contributes to efficiency of the parallel processing.

The permission or prohibition of the parallelization is determined in a unit of partial space in the first embodiment, whereas the same is determined in a unit of combination of the groups to which the paired virtual objects belong in the present embodiment. In such a case, the problem of inefficiency and increased cost in parallel processing can be also alleviated. The combination of the groups, into which no pair of the virtual objects is classified, may also be handled as a "cell" to be subject to the management of permission or prohibition of the parallelization.

Referring back to FIG. 9, the assigned pair determination unit 318 determines in which pair of the virtual objects the collision processor 226 should perform the collision process, by referring to the dynamic management table 158 of FIG. 8. The assigned pair determination units (not shown) respectively implemented by the second processor 122 and the third processor 133 also determine in which pair of the virtual objects the collision processor should perform the collision process in the same manner. The contents recorded in the dynamic management table 158 are determined based upon the information in the parallelization permission/prohibition management unit 210, namely, the contents recorded in the parallelization permission/prohibition management table 156 and the current state of the collision process, in a similar manner as described in the first embodiment.

The collision processor 226 performs the collision process on the pair of the virtual objects classified into the cell that has been assigned by the assigned pair determination unit 318. The collision processors (not shown) respectively implemented by the second processor 122 and the third processor 133 also perform the collision process on the virtual objects classified into the cells that have been assigned by the assigned pair determination units of the respective processors in a similar manner. The collision processes to be performed on the virtual objects are parallelized and then executed in this manner.

Figure 13:
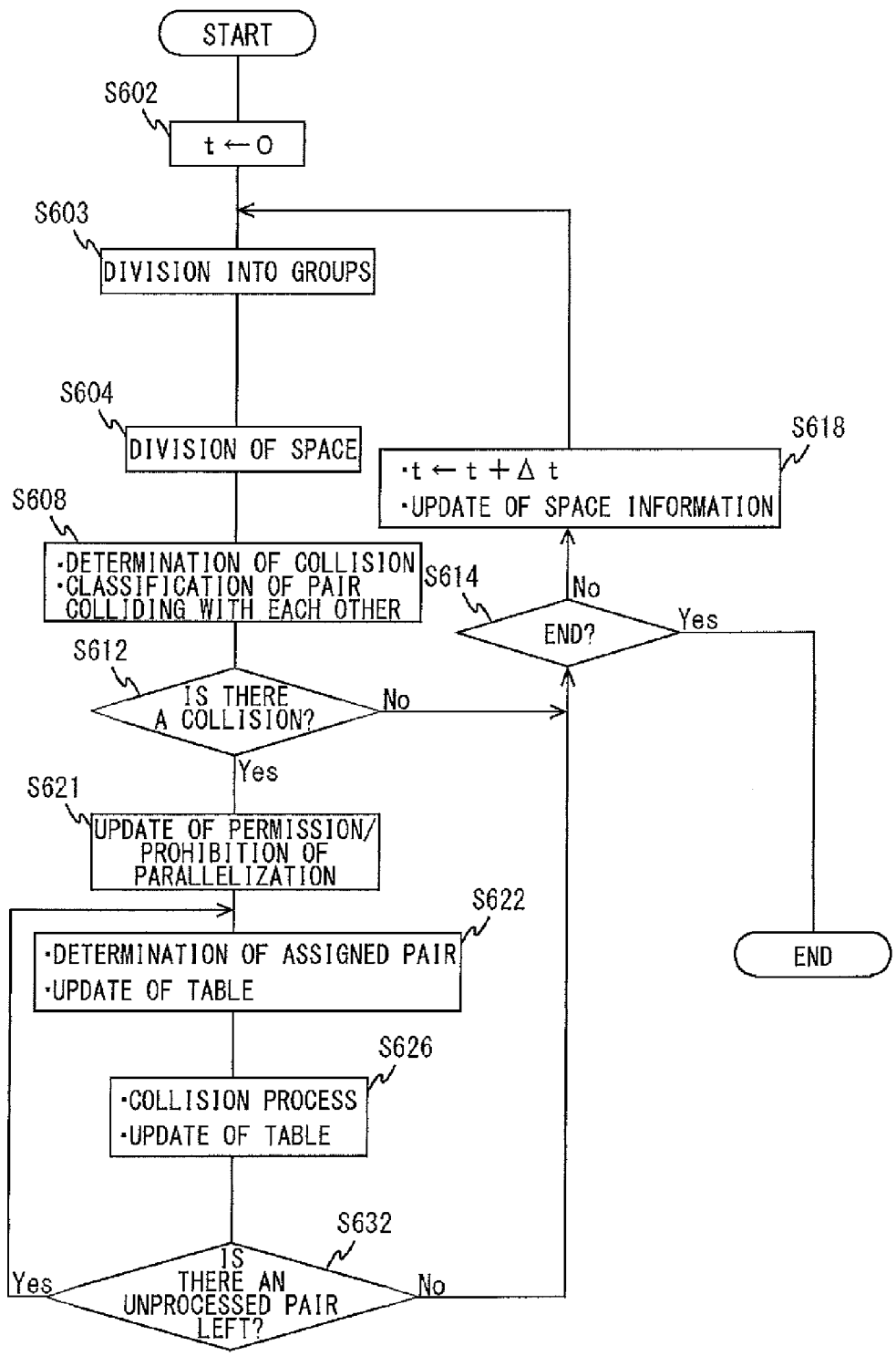
FIG. 13 is a flowchart of the operation of the first processor of FIG. 9.

FIG. 13 illustrates a flowchart of the operation of the first processor 111 of FIG. 9. Hereinafter, a description will be given with reference to FIG. 9. First, the parameter "t" representing the time is initialized to be zero (S602). The group division unit 306 divides plural virtual objects into plural groups according to the numeral applied to each virtual object (S603). The space division unit 206 divides the virtual space where the virtual objects are present, into plural partial spaces, in cooperation with the space division units of the other processors (S604). The collision determination unit 214 determines whether or not there is a collision between the virtual objects in any one of the partial spaces. Every time a pair of the virtual objects colliding with each other is found, the collision determination unit 214 classifies the pair of the virtual objects based upon the group to which each of the virtual objects belongs (S608). When there is no collision (No of S612), the space information update unit 202 updates the location and the velocity of the virtual object by "Δt" (S618) after the end determination is performed (No of S614). Subsequently, a series of processes from the step of dividing into groups (S603) to the step of determining the collision (S608) are performed again. In this process, if, for example, a user gives an instruction of interrupt, the collision process is terminated subsequent to the end determination (Yes of S614).

When there is a collision (Yes of S612), the parallelization permission/prohibition management unit 210 updates the parallelization permission/prohibition management table 156 of FIG. 8, in cooperation with the parallelization permission/prohibition management units of the other processors (S621). The assigned pair determination unit 318 determines in which one of the cells, into each of which a pair of the virtual objects has been classified, the collision processor 226 should perform the collision process, by referring to the dynamic management table 158, and then updates the dynamic management table 158 based upon the above determination (S622). The collision processor 226 performs the collision process on the pair of the virtual objects that have been determined by the assigned pair determination unit 318. When finishing the process, the collision processor 226 updates the dynamic management table 158 (S626). After that, when there is a cell where the collision process has not been initiated yet (hereinafter, referred to as "unprocessed cell") (Yes of S632), the step of determining the pair to be assigned (S622) and the step of collision process (S626) are executed again. When there is no unprocessed cell left (No of S632), the space information update unit 202 updates the location and the velocity of the virtual object by "Δt" (S618), after the end determination is performed (No of S614). Subsequently, a series of processes from the step of dividing into groups (S603) to the step of the collision process (S626) are performed again.

According to the present embodiment, the parallelization permission/prohibition management unit 210 stores in the parallelization permission/prohibition management table 156 the permission or prohibition of parallelization in a unit of combination of groups to which the paired virtual objects belong. Referring to the table, the assigned pair determination unit 318 determines in which pair of the virtual objects the collision processor 226 should performs the collision process. This releases the collision processor 226 from performing the process for the exclusive control over each of the virtual objects, therefore resulting in the contribution to the improved efficiency and reduced cost, in the same manner as the first embodiment. In addition, this is advantageous for simplifying the hardware configuration of the object collision processing apparatus 100 and minimizing the complexity associated with the parallelization, resulting in an excellent efficiency of the parallel processing, as in the first embodiment.

The description of the invention given above is based upon the embodiments. These embodiments are illustrative in nature and various variations in constituting elements and processes involved are possible. Those skilled in the art would readily appreciate that such variations are also within the scope of the present invention. Hereinafter, variations will be described.

In the above embodiments, the first processor 111 through the third processor 133 perform the similar functions, but the present invention is not limited thereto. Only the first processor 111 may have the functions other than those fulfilled by the collision processor. In this case, the first processor 111 assigns the collision processes to the other processors. This variation also contributes to the enhanced efficiency and the reduced cost of the parallel processing, in a similar manner to the embodiments discussed above.

Besides the first processor 111 through the third processor 133, a control processor that controls the above processors may be provided separately. The control processor may update the parallelization permission/prohibition management table 156 and the dynamic management table 158, or may assign the collision process to each of the processors. This variation also contributes to the enhanced efficiency and the reduced cost of the parallel processing, as in the embodiments described above, since the process for the exclusive control on each virtual object is no more necessary.

The distributed memory architecture in which each processor has a local memory therein has been described in the above embodiments, but the present invention is not limited thereto. The present invention may employ a shared memory architecture.

In the second embodiment, the permission or prohibition is determined in a unit of combination of groups to which the paired virtual objects belong. Therefore, the embodiment could be applied to a case where the space is not divided.

What is claimed is:

1. An object collision processing method comprising:
    dividing a virtual space where a plurality of dynamically moving virtual objects are present, into a plurality of fixed virtual space subareas;
    allowing a processor among a plurality of processors to perform collision processing of a collision of dynamically moving virtual objects located in one or more subareas, by performing collision processing on the one or more subareas involved in the collision, wherein
    among the plurality of processors remaining, collision processing will be suspended in a subject subarea that is not involved in the collision, if:
    (i) the subject subarea is adjacent to the one or more subareas involved in the collision; and
    (ii) a dynamically moving virtual object among the plurality of objects that is not involved in the collision is determined to be located on a boundary between the subject subarea and the one or more subareas involved in the collision.

2. The method of claim 1, wherein:
    said suspending of collision processing among the plurality of processors remaining includes storing the combination of the subject subarea and the adjacent one or more subareas, in which collision processing is to be suspended, in a table provided in a memory area shared by the plurality of the processors; and
    said allowing includes allowing one of the plurality of the processors to refer to the table, so as to assign thereto a collision process, which is not suspended from being performed in parallel with another collision process currently performed by another processor.

3. The method of claim 1, further comprising enabling, prior to said allowing, each of the plurality of the processors to determine whether or not there is a collision between the virtual objects in any one of the virtual space subareas, so as to parallelize the determination in a virtual space subarea.

4. An object collision processing method comprising:
    classifying a plurality of dynamically moving virtual objects respectively into one of a plurality of groups according to a predetermined rule in advance;
    suspending of collision processing among a plurality of processors for a first pair of virtual objects simultaneously set to collide during a collision of a second pair of virtual objects that is currently being processed, if:
    (i) the second pair of virtual objects belongs to a first group and a second group, respectively, the first group and the second group being any one of the plurality of groups, and (ii) any of the first pair of virtual objects belongs to the first group or second group of the second pair of virtual objects; and allowing a processor among the plurality of processors to perform the collision processing on the virtual objects of the first pair if collision processing is not suspended.

5. The method of claim 4, wherein identification information is assigned to each of the plurality of virtual objects, and said classifying is performed in accordance with the identification information.

6. The method of claim 4, wherein:

said suspending includes storing a combination of the pairs of the virtual objects, the parallelization of which is suspended, in a table provided in a memory area shared by the plurality of the processors; and said allowing includes allowing one of the plurality of the processors to refer to the table, so as to assign thereto a collision process, which is not suspended from being performed in parallel with another collision process currently performed by another processor.

7. The method of claim 4, wherein the collision process includes a process of updating a parameter indicating an attribute of the virtual object in response to the collision occurring between the virtual objects.

8. A non-transitory computer-readable medium with a computer program embedded thereon that is operable to cause a computer to perform an object collision process, the program comprising modules for:

dividing a virtual space where a plurality of dynamically moving virtual objects are present, into a plurality of fixed virtual space subareas;

allowing a processor among a plurality of processors to perform collision processing of a collision of dynamically moving virtual objects located in one or more subareas, by performing collision processing on the one or more subareas involved in the collision, wherein among the plurality of processors remaining, collision processing will be suspended in a subject subarea that is not involved in the collision, if:

(i) the subject subarea is adjacent to the one or more subareas involved in the collision; and (ii) a dynamically moving virtual object among the plurality of objects that is not involved in the collision is determined to be located on a boundary between the subject subarea and the one or more subareas involved in the collision.

9. The computer program of claim 8, wherein:

said suspending of collision processing among the plurality of processors remaining includes storing the combination of the subject subarea and the adjacent one or more subareas, in which collision processing is to be suspended, in a table provided in a memory area shared by the plurality of the processors; and said allowing includes allowing one of the plurality of the processors to refer to the table, so as to assign thereto a collision process, which is not suspended from being performed in parallel with another collision process currently performed by another processor.

10. The computer program of claim 8, the program further comprising a module for enabling, prior to said allowing, each of the plurality of the processors to determine whether or not there is a collision between the virtual objects in any one of the virtual space subareas, so as to parallelize the determination in a virtual space subarea.

11. A non-transitory computer-readable medium with a computer program embedded thereon that is operable to cause a computer to perform an object collision process, the program comprising modules for:

classifying a plurality of dynamically moving virtual objects respectively into one of a plurality of groups according to a predetermined rule in advance;

suspending collision processing among a plurality of processors for a first pair of virtual objects simultaneously set to collide during a collision of a second pair of virtual objects that is currently being processed, if:

(i) the second pair of virtual objects belongs to a first group and a second group, respectively, the first group and the second group being any one of the plurality of groups, and (ii) any of the first pair of virtual objects belongs to the first group or second group of the second pair of virtual objects; and allowing a processor among the plurality of processors to perform the collision processing on the virtual objects of the first pair if collision processing is not suspended.

12. The computer program of claim 11, wherein:

said suspending includes storing a combination of the pair of the virtual objects, the parallelization of which is suspended, in a table provided in a memory area shared by the plurality of the processors; and said allowing includes allowing one of the plurality of the processors to refer to the table, so as to assign thereto a collision process, which is not suspended from being performed in parallel with another collision process currently performed by another processor.

13. The computer program of claim 11, wherein the collision process includes a process of updating a parameter indicating an attribute of the virtual object in response to the collision occurring between the virtual objects.

14. An object collision processing apparatus comprising:

a plurality of processors;

a division unit, which is realized by one of the processors and which divides a virtual space where a plurality of dynamically moving virtual objects are present into a plurality of fixed virtual space subareas;

an assigned space determination unit, which is realized by one of the processors and which determines which one of the plurality of processors is allowed to perform collision processing of a collision of dynamically moving virtual objects located in one or more subareas, by performing collision processing on the one or more subareas involved in the collision; and a collision processing permission and suspension management unit, which is realized by one of the plurality of processors and which suspends, among the plurality of processors remaining, collision processing in a subject subarea that is not involved in the collision, if:

(i) the subject subarea is adjacent to the one or more subareas involved in the collision; and (ii) a dynamically moving virtual object among the plurality of objects that is not involved in the collision is determined to be located on a boundary between the subject subarea and the one or more subareas involved in the collision.

15. The apparatus of claim 14, further comprising a table provided in a memory area shared by the plurality of the processors and managed by the collision processing permission and suspension management unit, so as to store the combination of the subject subarea and the adjacent one or more subareas, in which collision processing is to be suspended, wherein the assigned space determination unit is provided in each of the plurality of the processors, and wherein the assigned space determination unit of each of the processors refers to the table, so as to determine to assign thereto a collision process, which is not suspended from being performed in parallel with another collision process currently performed by another processor.

16. The apparatus of claim 14, further comprising a collision determination unit, which is realized by one of the plurality of processors and which determines whether or not there is a collision of the virtual objects in any one of the virtual space subareas, prior to performing the collision process.

17. An object collision processing apparatus comprising:
a plurality of processors;
a classification unit, which is realized by one of the processors and which classifies a plurality of dynamically moving virtual objects respectively into one of a plurality of groups according to a predetermined rule in advance;
a collision processing permission and suspension management unit, which is realized by one of the processors and which manages information for suspending collision processing among the plurality of processors for a first pair of virtual objects simultaneously set to collide during a collision of a second pair of virtual objects that is currently being processed, if:
(i) the second pair of virtual objects belongs to a first group and a second group, respectively, the first group and the second group being any one of the plurality of groups, and
(ii) any of the first pair of virtual objects belongs to the first group or second group of the second pair of virtual objects; and
an assigned pair determination unit, which is realized by one of the plurality of processors and which determines a processor among the plurality of processors to perform collision processing on the first pair of virtual objects if collision is not suspended, and
wherein collision processing is performed based on the determination by the assigned pair determination unit.

18. The apparatus of claim 17, further comprising a table provided in a memory area shared by the plurality of the processors and managed by the parallelization permission and suspension management unit, so as to store a combination of the pairs of the virtual objects, the parallelization of which is suspended,
wherein the assigned pair determination unit is provided in each of the plurality of the processors, and
wherein the assigned pair determination unit of each of the processors refers to the table, so as to determine to assign thereto a collision process, which is not suspended from being performed in parallel with another collision process currently performed by another processor.

19. The apparatus of claim 17, wherein the collision process includes a process of updating a parameter indicating an attribute of the virtual object in response to the collision occurring between the virtual objects.

* * * * *